US008886863B2

(12) United States Patent
Imai

(10) Patent No.: US 8,886,863 B2
(45) Date of Patent: Nov. 11, 2014

(54) HANDY TERMINAL FOR IDENTIFYING A CONNECTED-TO CRADLE BASED ON A NETWORK TERMINAL ADDRESS THEREOF, AND NON-TRANSITORY COMPUTER READABLE MEDIUM

(75) Inventor: Yuji Imai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 184 days.

(21) Appl. No.: 13/431,146

(22) Filed: Mar. 27, 2012

(65) Prior Publication Data

US 2012/0254494 A1 Oct. 4, 2012

(30) Foreign Application Priority Data

Mar. 30, 2011 (JP) ................................. 2011-073971
Nov. 7, 2011 (JP) ................................. 2011-243178

(51) Int. Cl.
*G06F 13/00* (2006.01)
*H04L 29/12* (2006.01)
*G06F 1/16* (2006.01)
*H04W 84/12* (2009.01)

(52) U.S. Cl.
CPC .......... *H04L 61/2038* (2013.01); *G06F 1/1632* (2013.01); *H04L 61/103* (2013.01); *H04W 84/12* (2013.01)
USPC ....................................................... 710/303

(58) Field of Classification Search
CPC ... G06F 13/409; G06F 13/4081; G06F 1/632; G06F 13/385; G06F 3/023; G06F 3/0689
USPC ................. 710/8–19, 62–64, 72–74, 300–306
See application file for complete search history.

(56) References Cited

U.S. PATENT DOCUMENTS

| 6,519,144 | B1 * | 2/2003 | Henrie et al. ............ 361/679.43 |
| 7,171,378 | B2 * | 1/2007 | Petrovich et al. .......... 705/26.43 |
| 7,464,215 | B2 * | 12/2008 | Kawai ........................... 710/303 |
| 7,716,301 | B2 | 5/2010 | Yoshizawa et al. |
| 2005/0086328 | A1 * | 4/2005 | Landram et al. .............. 709/220 |

(Continued)

FOREIGN PATENT DOCUMENTS

| EP | 1359712 A2 | 11/2003 |
| JP | 2002-135254 A | 5/2002 |

(Continued)

OTHER PUBLICATIONS

Japanese Office Action dated Oct. 28, 2013 (and English translation thereof) in counterpart Japanese Application No. 2011-243178.
Japanese Office Action dated Jul. 22, 2013 (and English translation thereof) in counterpart Japanese Application No. 2011-243178.
Japanese Office Action dated Apr. 9, 2013 (and English translation thereof) in counterpart Japanese Application No. 2011-243178.
Extended European Search Report dated Aug. 6, 2014 in counterpart European Application No. 12161939.9.

*Primary Examiner* — Raymond Phan
(74) *Attorney, Agent, or Firm* — Holtz, Holtz, Goodman & Chick PC

(57) ABSTRACT

There is provided a handy terminal connected to a cradle in a removable manner, wherein the cradle has a communication function and is connected to a network. The handy terminal includes: a determining unit configured to determine whether or not the handy terminal is connected to the cradle; an identifying unit configured to identify the cradle when the determining unit determines that the handy terminal is connected to the cradle; and an address setting unit configured to set a network terminal address for identifying the handy terminal on the network, depending on the identified cradle.

10 Claims, 10 Drawing Sheets

(56) References Cited

U.S. PATENT DOCUMENTS

| | | |
|---|---|---|
| ks2006/0184705 A1* | 8/2006 | Nakajima ..................... 710/303 |
| 2007/0002533 A1* | 1/2007 | Kogan et al. .................. 361/686 |
| 2009/0031069 A1* | 1/2009 | Habuto et al. ................. 710/303 |
| 2009/0070691 A1* | 3/2009 | Jain .............................. 715/760 |
| 2009/0164688 A1* | 6/2009 | Wright-Riley ................ 710/303 |
| 2012/0151022 A1* | 6/2012 | Ayyagari et al. .............. 709/222 |

FOREIGN PATENT DOCUMENTS

| | | |
|---|---|---|
| JP | 2005-244590 A | 9/2005 |
| JP | 2008-60668 A | 3/2008 |
| WO | WO 2007/032076 A1 | 3/2007 |

* cited by examiner

FIG. 4

M2 ADDRESS CORRESPONDENCE TABLE

| MAC ADDRESS | IP ADDRESS | STORE INFORMATION (RELATED INFORMATION) |
|---|---|---|
| 100 | 192. 168. 1. 1 | 100 |
| 200 | 192. 168. 2. 1 | 200 |
| ... | ... | ... |

HANDY TERMINAL FOR IDENTIFYING A CONNECTED-TO CRADLE BASED ON A NETWORK TERMINAL ADDRESS THEREOF, AND NON-TRANSITORY COMPUTER READABLE MEDIUM

CROSS-REFERENCE TO RELATED APPLICATION

This application claims priority from Japanese Patent Applications No. 2011-073971, filed on Mar. 30, 2011, and No. 2011-243178, filed on Nov. 7, 2011, the entire contents of which are hereby incorporated by reference.

BACKGROUND

1. Technical Field

Embodiments described herein relate to a handy terminal and a computer readable medium.

2. Related Art

Conventionally, a handy terminal which is used for stock management in a store is connected, via a USB (universal serial bus) cable or the like, to a LAN (local area network) cradle (function extender) which is connected to a LAN that is constructed in the store. The handy terminal performs an Ethernet (registered trademark) communication via the LAN cradle. In this communication system, a MAC address (media access control address) which is necessary for Ethernet communication is set in the LAN cradle and an IP address (Internet protocol address) is set in the handy terminal to be mounted on (connected to) the LAN cradle.

Incidentally, where an IP address is acquired using a server which is compatible with DHCP (dynamic host configuration protocol), it is not necessary to set an IP address in each handy terminal. However, where a DHCP server cannot be introduced as in the case of a small store or the like, an IP address is set in each handy terminal in a fixed manner.

FIG. 10 shows stores A and B which are connected to different subnets and in which LAN cradles CA and CB are installed in the respective stores A and B. An IP address for the store A is set in a handy terminal H1 and an IP address for the store B is set in a handy terminal H2.

In this case, since the different IP addresses are used, even if the handy terminal H1 is brought to the store B having another network address and is mounted on the LAN cradle CB for the store B, the handy terminal H1 cannot be used because the IP address for the store A is set therein. It is necessary to newly set the IP address for the store B in the handy terminal H1. In order to address such a situation, JP-A-2008-60668 discloses that an IP address to be set in a handy terminal is read from a cradle and a communication is performed, for example.

However, in JP-A-2008-60668, it is necessary for a handy terminal side to read an IP address from the cradle and use it and the cradle needs to be provided with a special function of managing IP addresses and enabling reading of an IP address from itself.

Furthermore, when a user uses a handy terminal while visiting plural stores, the user is required to call an application process for each store by inputting information of that store manually. However, inputting store information manually every time the user visits a new store is a heavy load on the user.

Still further, in a state that a handy terminal is not mounted on a cradle, a user may work using a wireless LAN that is constructed in the store. In view of such a situation, employing different security settings for individual stores is more desirable in terms of security management than employing the same security setting for all stores. However, making security setting every time the user visits a new store and uses a brought handy terminal, there is also a heavy load on the user.

SUMMARY

One or more illustrative aspects of the present invention are to allow a handy terminal to make a communication with a new network even if a cradle is not provided with any special function and a network terminal address of the handy terminal is not re-set manually every time the handy terminal is connected to a cradle in a different subnet.

According to one or more illustrative aspects of the present invention, there is provided a handy terminal connected to a cradle in a removable manner, wherein the cradle has a communication function and is connected to a network. The handy terminal includes: a determining unit configured to determine whether or not the handy terminal is connected to the cradle; an identifying unit configured to identify the cradle when the determining unit determines that the handy terminal is connected to the cradle; and an address setting unit configured to set a network terminal address for identifying the handy terminal on the network, depending on the identified cradle.

Other aspects and advantages of the present invention will be apparent from the following description, the drawings and the claims.

BRIEF DESCRIPTION OF DRAWINGS

FIG. 4 shows an address correspondence table M2 of the handy terminal 1;

DETAILED DESCRIPTION OF EXEMPLARY EMBODIMENTS

Embodiment 1

A first embodiment of the present invention will be hereinafter described with reference to FIGS. 1-5.

Figure 1:
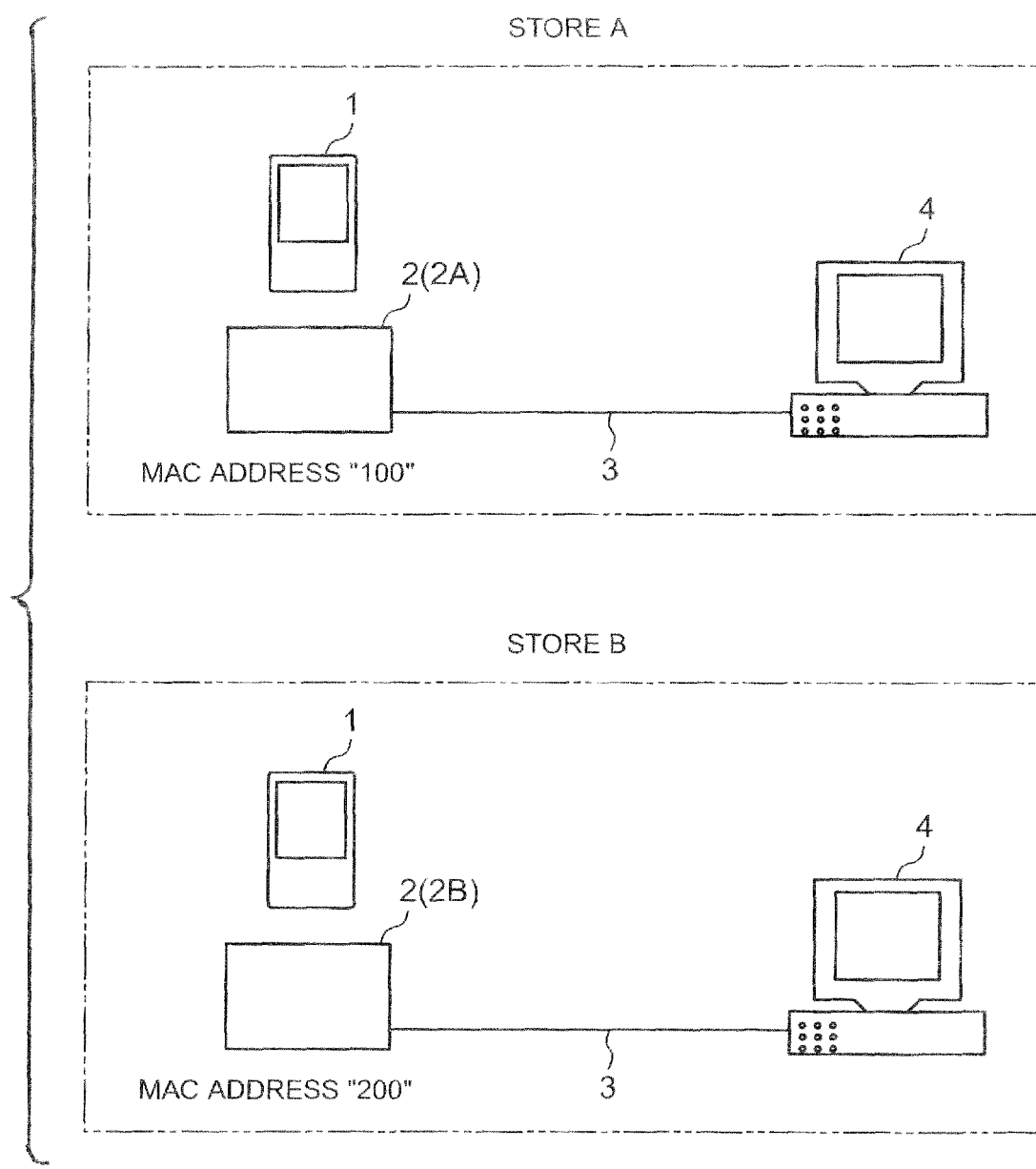
FIG. 1 shows a communication network system including a handy terminal 1 according to a first embodiment, which is used for stock management in a store.

FIG. 1 shows a communication network system including a handy terminal 1 which is used for stock management in a store. The handy terminal 1 is connected to a stand-type LAN cradle (function extender) 2 in a removable manner. When the handy terminal 1 is mounted on (connected to) the LAN cradle 2, a state that the handy terminal 1 and the LAN cradle 2 can communicate with each other is established.

In the state that the handy terminal 1 is mounted on the LAN cradle 2, the handy terminal 1 is connected to a server 4 via the LAN cradle 2 and an Ethernet (registered trademark) 3, whereby data can be exchanged between the handy terminal 1 and the LAN cradle 2. The LAN cradle 2 is installed in each store. In the example of FIG. 1, LAN cradles 2A and 2B are installed in respective stores A and B which are connected to different subnets. Although in the embodiment the Ethernet 3 is a wired LAN, the invention is not limited to such a case. The Ethernet 3 may be a wireless LAN.

The LAN cradles 2A and 2B are stored with MAC addresses as their own unique addresses. For example, the LAN cradles 2A and 2B are stored with MAC addresses "100" and "200," respectively. Each of the LAN cradles 2A and 2B has a function of reading its own MAC address in response to a transmission request from a handy terminal 1 mounted thereon and sending the read-out MAC address to the request source handy terminal 1. The other functions of each of the LAN cradles 2A and 2B are commonly known ones and hence will not be described below. In the following description, an appropriate one of the term "LAN cradles 2A and 2B" and the generic term "LAN cradle 2" will be used for each situation.

Figure 2:
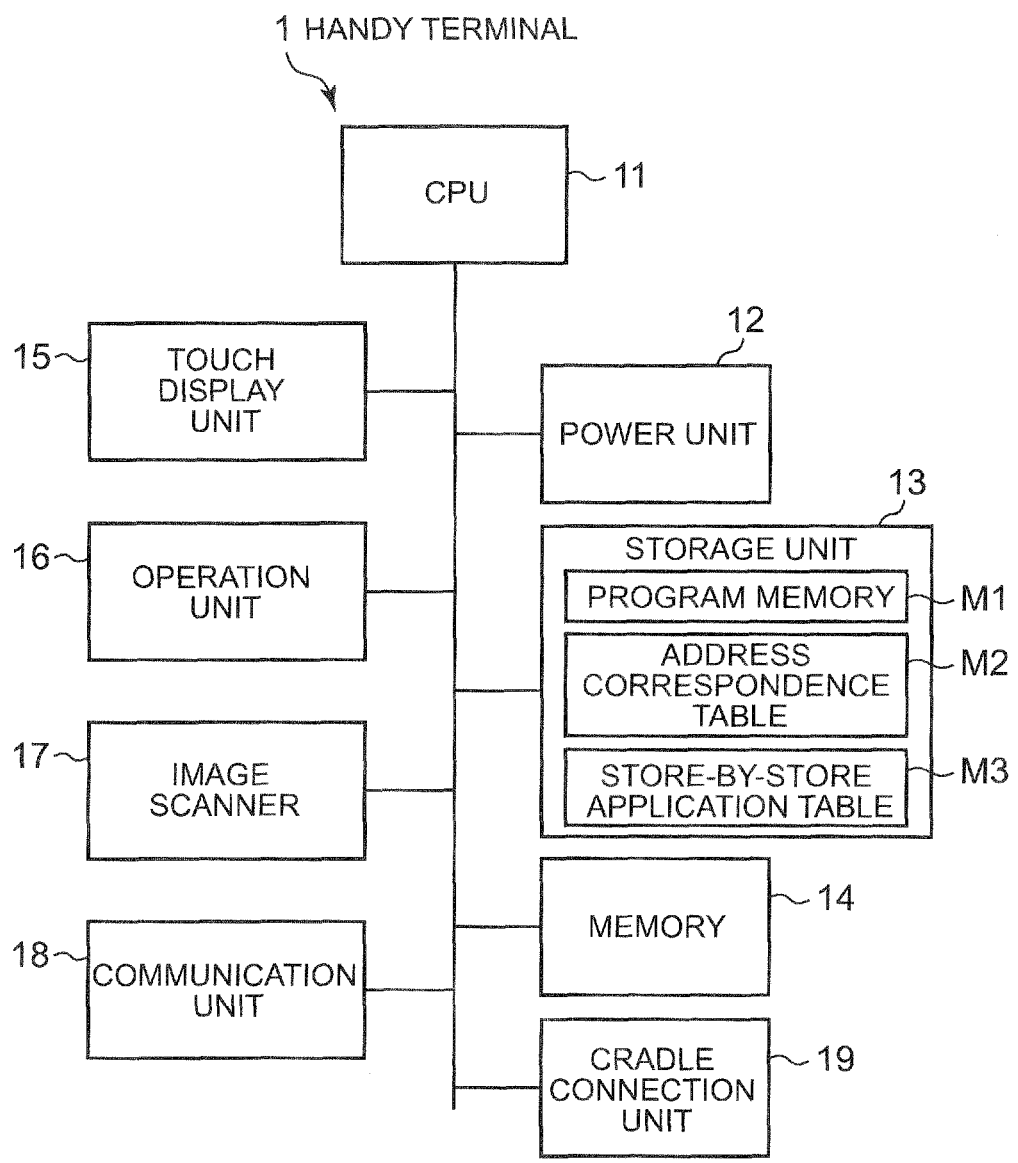
FIG. 2 is a block diagram showing basic components of the handy terminal 1.

FIG. 2 is a block diagram showing basic components of the handy terminal 1. The handy terminal 1 has a thin, rectangular-parallelepiped-shaped cabinet, and is equipped with a CPU (central processing unit; core component) 11, a power unit 12, a storage unit 13, a memory 14, a touch display unit 15, an operation unit 16, an image scanner 17, a communication unit 18, and a cradle connection unit 19. The CPU 11 operates on power that is supplied from the power unit (secondary battery) 12, and controls the entire operation of the handy terminal 1 according to various programs stored in the storage unit 13.

The storage unit 13 includes a ROM, a flash memory, or the like, and is provided with a program memory M1 which is stored with an operating system (OS), programs for implementing the embodiment according to an operation procedure shown in FIG. 5 (described later), various applications, etc., an address correspondence table M2 (described later), a store-by-store application table M3 (described later). The storage unit 13 may include a detachable, portable memory (recording medium) such as an SD card or an IC card or a storage area of a prescribed external server in a state that the handy terminal 1 is connected to a network via a communication function (not shown). The memory 14 is a work area for temporarily storing various kinds of information that are necessary for operation of the handy terminal 1, such as time information and flag information.

The touch display unit 15 is a large touch display unit which occupies almost all the front surface of the thin, rectangular-parallelepiped-shaped cabinet. The touch display unit 15 includes a touch input device (touch screen) for detecting a touch operation position of a finger, a pen, or the like and thereby allowing input of coordinate data of that position, and employs, as a display panel, a high-resolution liquid crystal display or an organic EL (electroluminescence) display, for example. The operation unit 16 is equipped with various push-button keys such as a power button (not shown). The CPU 11 performs processing according to an operation signal that is input through the touch display unit 15 or the operation unit 16.

The image scanner 17 is to shoot a code information image by means of an image sensor such as a CCD or a CMOS sensor. The CPU 11 recognizes code information by analyzing the image data taken by the image scanner 17. The communication unit 18 performs a data communication with the server 4 via the LAN cradle 2 and the Ethernet 3 in a state that the handy terminal 1 is mounted on the LAN cradle 2. The cradle connection unit 19 exchanges data with the LAN cradle 2 by a non-contact infrared communication, for example. And the cradle connection unit 19 has a detecting function of detecting whether or not the handy terminal 1 is connected to (mounted on) the LAN cradle 2, that is, a communication-enabled state is established. When the cradle connection unit 19 has detected mounting of the handy terminal 1 on the LAN cradle 2, the CPU 11 reads a MAC address from the LAN cradle 2 via the cradle connection unit 19.

Figure 3:
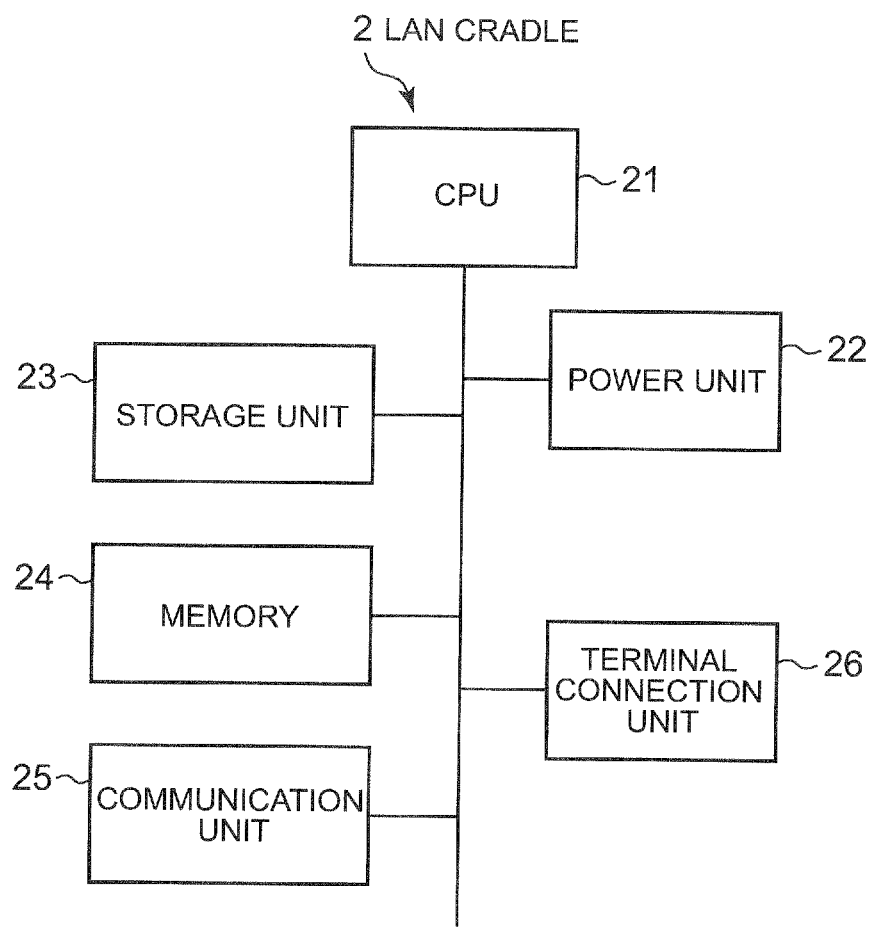
FIG. 3 is a block diagram showing basic components of a LAN cradle 2.

FIG. 3 is a block diagram showing basic components of the LAN cradle 2. The LAN cradle 2 is equipped with a CPU 21 (core component), a power unit 22, a storage unit 23, a memory 24, a communication unit 25, and a terminal connection unit 26. The CPU 21 operates on power that is supplied from the power unit (AC power source) 22, and controls the entire operation of the LAN cradle 2 according to various programs stored in the storage unit 23. When receiving a MAC address transmission request from the handy terminal 1, the CPU 21 reads a unique address (MAC address) of the LAN cradle 2 stored in the storage unit 23 and sends the read-out MAC address to the handy terminal 1 via the terminal connection unit 26. In a state that the handy terminal 1 is mounted on the LAN cradle 2, a data communication is performed between them via the terminal connection unit 26 and the communication unit 25.

FIG. 4 shows the address correspondence table M2 of the handy terminal 1. The address correspondence table M2 is an address table in which the MAC address of each of the LAN cradles 2A and 2B which are connected to the different subnets is correlated with a network terminal address (IP address) and store information for identification of the store in which the LAN cradle 2 is installed. In the example of FIG. 4, an IP address "192.168.1.1" and store information "100" are correlated with the MAC address "100" of the LAN cradle 2A of the store A. And an IP address "192.168.2.1" and store information "200" are correlated with the MAC address "200" of the LAN cradle 2B of the store B.

The store information (related information relating to the LAN cradle 2) is information relating to an area where the store in which the LAN cradle 2 is installed is located, that is, information for identification of the store in which the LAN cradle 2 is installed. The store information is not limited to a character string such as a store name or an address and may be a numeral string such as a telephone number or a serial number. When the cradle connection unit 19 has detected that the handy terminal 1 has been mounted on the LAN cradle 2, the CPU 11 reads the IP address and the store information corresponding to the MAC address that is read from the LAN cradle 2 by searching the address correspondence table M2 using the MAC address and sets them in the handy terminal 1. The CPU 11 reads application specifying information corresponding to the thus-set store information by searching the store-by-store application table M3 using the store information and executes the corresponding application process. In the store-by-store application table M3, pieces of application specifying information are correlated with respective pieces of store information.

Next, the operation concept of the handy terminal 1 according to the embodiment will be described with reference to a flowchart of FIG. 5. Each step of the flowchart is stored in the form of program code, and the steps are executed sequentially according to the program code. The steps may be executed sequentially according to the program code that is transmitted over a transmission medium such as a network. This also applies to the other embodiments to be described later; the process of each embodiment can be executed according to programs and data that are either stored in the storage medium or transmitted externally via a transmission medium.

Figure 5:
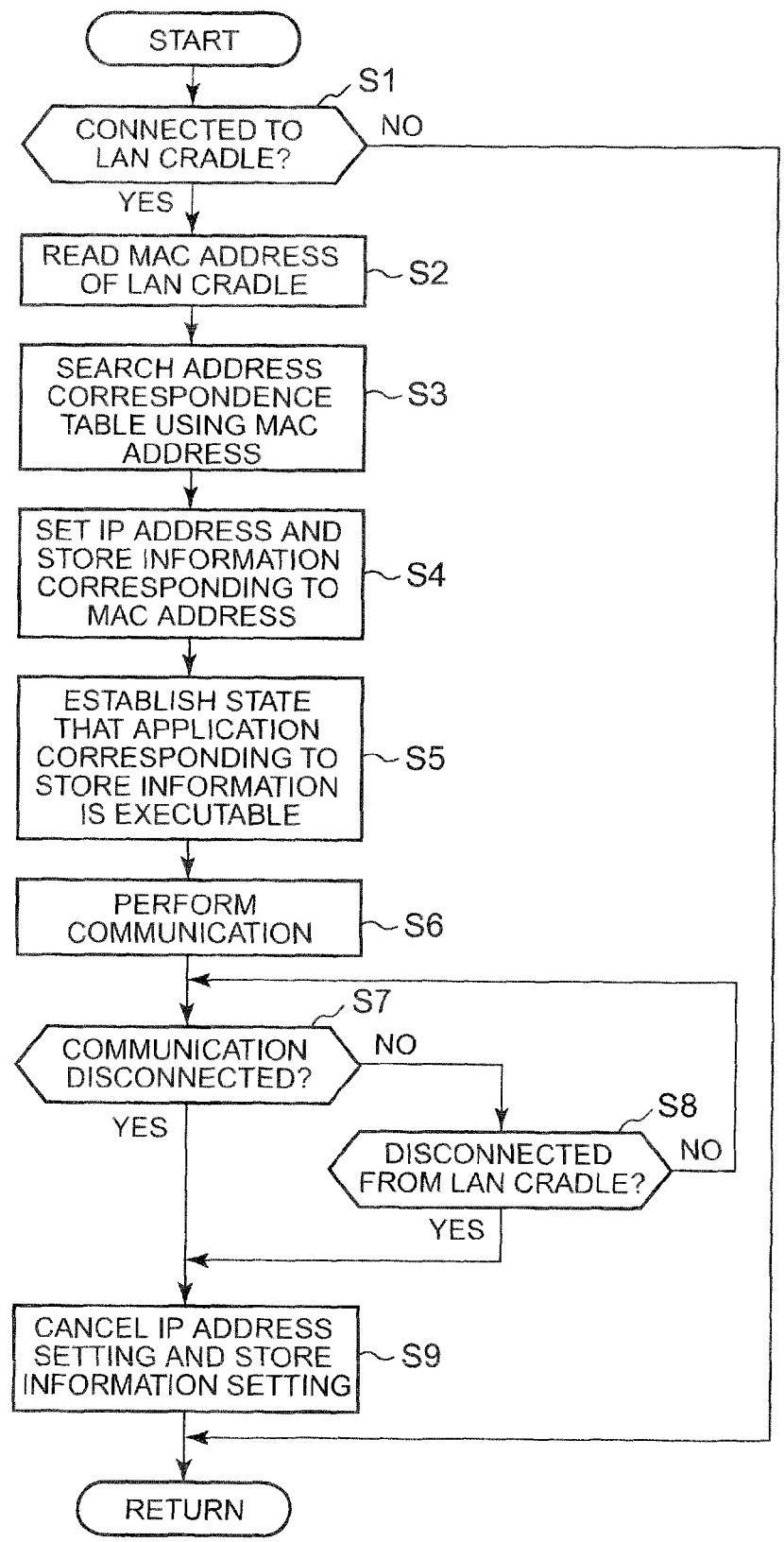
FIG. 5 is a flowchart of a communication process which is executed by the handy terminal 1 in response to an operation that commands a start of a communication.

FIG. 5 is a flowchart that outlines the entire process of the handy terminal 1. Upon exiting the process of FIG. 5, the CPU 11 returns to a main process (not shown).

FIG. 5 is a flowchart of a communication process which is executed by the handy terminal 1 in response to an operation that commands a start of a communication.

First, at step S1, the CPU 11 checks whether or not the handy terminal 1 is connected to (mounted on) the LAN cradle 2 on the basis of a detection result of the cradle connection unit 19. If the handy terminal 1 is not mounted on the LAN cradle 2 (S1: no), the process of FIG. 5 is finished to invalidate the communication start operation. If the handy terminal 1 is mounted on the LAN cradle 2 (S1: yes), at step S2 the CPU 11 sends a MAC address transmission request to the LAN cradle 2 and acquires a MAC address that is transmitted from the LAN cradle 2 in response the request. For example, when the handy terminal 1 is mounted on the LAN cradle 2A, the CPU 11 reads and acquires the MAC address "100" of the LAN cradle 2A. When the handy terminal 1 is mounted on the LAN cradle 2B, the CPU 11 reads and acquires the MAC address "200" of the LAN cradle 2B.

At step S3, the CPU 11 searches the address correspondence table M2 using the MAC address acquired from the LAN cradle 2. At step S4, the CPU 11 reads an IP address corresponding to the MAC address and sets it as a network terminal address of the handy terminal 1. Furthermore, the CPU 11 reads store information corresponding to the MAC address and sets it. In this state, at step S5, the CPU 11 reads application specifying information corresponding to the thus-set store information by searching the store-by-store application table M3 using the store information and establishes a state that the corresponding application process is executable. At step S6, the CPU 11 starts a data communication with the server 4 via the LAN cradle 2 using the thus-set IP address. At step S7, the CPU 11 judges whether or not ending (disconnection) of the communication has been commanded by a user operation or automatic detection. At step S8, the CPU 11 judges whether or not the handy terminal 1 has been removed (disconnected) from the LAN cradle 2.

If ending (disconnection) of the communication has not been commanded (S7: no) and the handy terminal 1 is kept mounted on (connected to) the LAN cradle 2 (S8: no), the communication process is continued. If ending of the communication has been commanded (S7: yes) or the handy terminal 1 has been removed from the LAN cradle 2 (S8: yes), at step S9 the CPU 11 cancels the IP address setting used in the current communication to invalidate the IP address and also cancels the store information setting. Then, the CPU 11 exits the process of FIG. 5.

As described above, in the first embodiment, when connected to a LAN cradle 2, the handy terminal 1 identifies the LAN cradle 2 and sets an IP address of the handy terminal 1 itself according to the identified LAN cradle 2. Therefore, it is not necessary to re-set an IP address of the handy terminal itself manually every time a cradle 2 having a communication function that is connected to a new subnet is used. The convenience is thus enhanced.

The handy terminal 1 sets, according to an identified LAN cradle 2, an IP address of the handy terminal 1 itself and store information for identification of the store in which the LAN cradle 2 is installed. Therefore, it is not necessary to re-set an IP address of the handy terminal 1 and store information manually every time the handy terminal 1 is connected to a cradle 2 having a communication function in a new subnet. The convenience is thus enhanced.

A state that an application process corresponding to a store in which a LAN cradle 2 is installed can be executed is established merely by connecting the handy terminal 1 to the LAN cradle 2. Therefore, the application settings can be changed so as to be suitable for each store.

When mounted on a LAN cradle 2, the handy terminal 1 reads and sets an IP address and store information corresponding to a MAC address that is read from the LAN cradle 2 by searching the address correspondence table M2 using the read-out MAC address. Therefore, an IP address and store information can be set for each LAN cradle 2 merely by preparing the address correspondence table M2.

The handy terminal 1 cancels the IP address setting and the store information setting when removed (disconnected) from the LAN cradle 2. This makes it possible to set an IP address and store information easily for each LAN cradle 2.

In the above-described first embodiment, store information for identification of a store in which a LAN cradle 2 is installed is set as related information relating to the LAN cradle 2. Alternatively, information for identification of a selling area, a selling corner, or the like may be set.

Embodiment 2

A second embodiment of the invention will be described below with reference to FIGS. 6 and 7.

In the above-described first embodiment, when mounted on a LAN cradle 2, the handy terminal 1 reads and sets an IP address and store information corresponding to a MAC address that is read from the LAN cradle 2 by searching the address correspondence table M2 using the read-out MAC address. In contrast, in the second embodiment, when mounted on a LAN cradle 2, a handy terminal 1A also sets security information of a wireless LAN that is constructed in the store in which the LAN cradle 2 is installed. An essential part of the second embodiment will mainly be described below. Items having basically the same items or items having the same names in the first embodiment will be given the same reference symbols as the latter and will not be described in detail.

In the second embodiment, in a non-connection state that the handy terminal 1A is separated from the LAN cradle 2, data exchange between the handy terminal 1A and the server 4 is performed over a wireless LAN (not shown). In such a store, when mounted on (connected to) the LAN cradle 2 installed therein, the handy terminal 1A sets not only an IP address and store information but also security information of the wireless LAN. Security information of the wireless LAN is set in such a manner that an encryption key (security key) that is required in performing connection setting of an encryption method (e.g., WEP) of the wireless LAN is set. In a state that the handy terminal 1A is not mounted on the LAN cradle 2, the handy terminal 1A prohibits an encryption key of the wireless LAN from being set from a job menu. That is, setting of an encryption key of the wireless LAN is permitted only when the handy terminal 1A is mounted on the LAN cradle 2.

Figure 6:
FIG. 6 shows an address correspondence table M2 of a handy terminal 1A according to a second embodiment.

FIG. 6 shows an address correspondence table M2 of the handy terminal 1A. The address correspondence table M2 is an address table in which the MAC address of each of the LAN cradles 2A and 2B which are connected to the different subnets is correlated with not only a network terminal address (IP address) and store information for identification of the store in which the LAN cradle 2 is installed but also an encryption key (security key) that is required in performing connection setting of an encryption method (e.g., WEP) of the wireless LAN. In the example of FIG. 6, not only an IP address "192.168.1.1" and store information "100" but also an encryption key "111111" of the store A is correlated with the MAC address "100" of the LAN cradle 2A of the store A. And not only an IP address "192.168.2.1" and store information "200" but also an encryption key "22222" of the store B is correlated with the MAC address "200" of the LAN cradle 2B of the store B.

Figure 7:
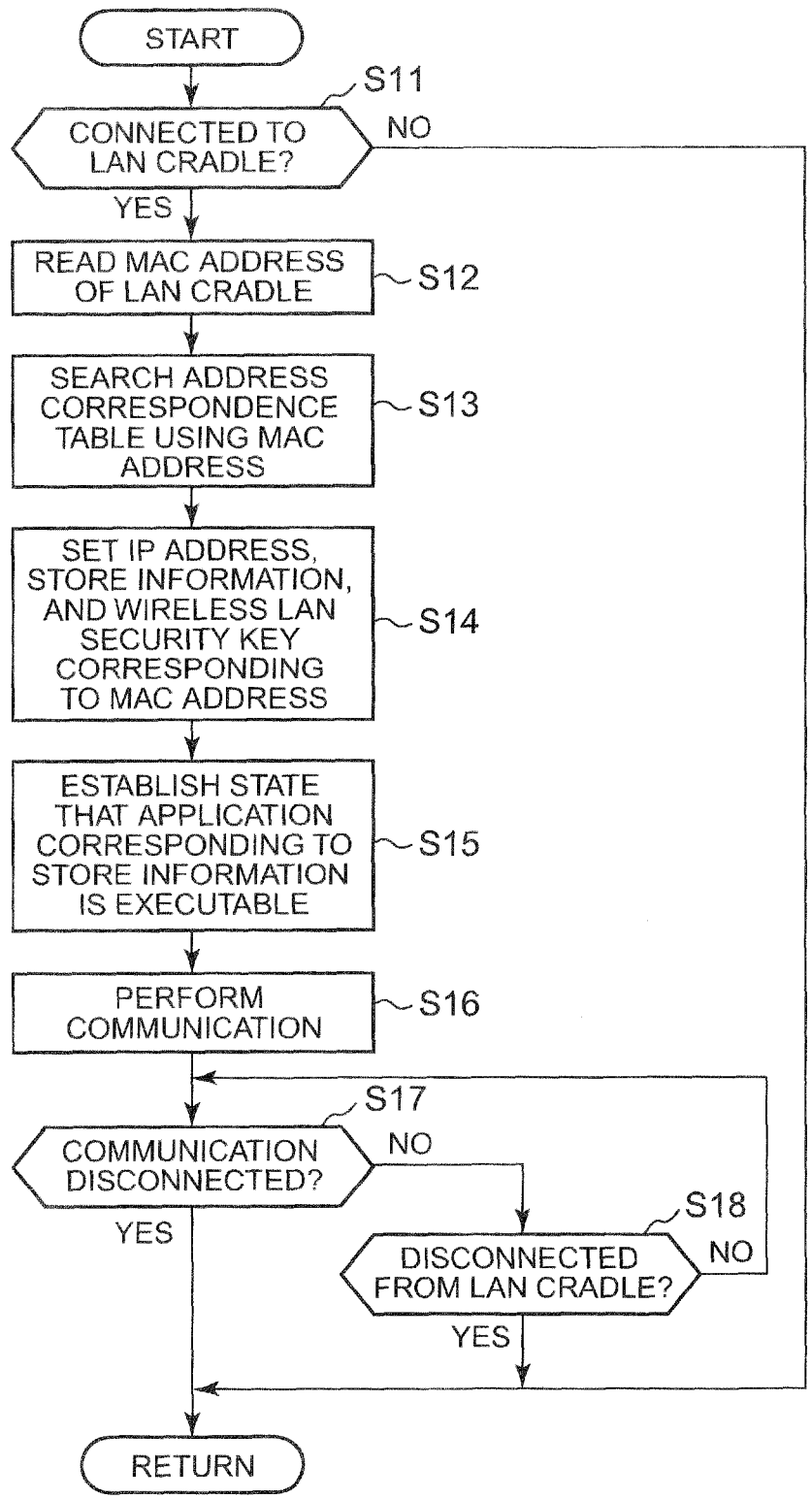
FIG. 7 is a flowchart of a communication process which is executed by the handy terminal 1A in response to an operation that commands a start of a communication.

FIG. 7 is a flowchart of a communication process which is executed by the handy terminal 1A according to the second embodiment in response to an operation that commands a start of a communication.

First, if the handy terminal 1A is not mounted on (connected to) the LAN cradle 2 (S11: no), the process of FIG. 7 is finished to invalidate the communication start operation. If the handy terminal 1A is mounted on the LAN cradle 2 (S11: yes), at step S12 the CPU 11 sends a MAC address transmission request to the LAN cradle 2 and acquires a MAC address that is transmitted from the LAN cradle 2 in response the request.

At step S13, the CPU 11 searches the address correspondence table M2 using the MAC address acquired from the LAN cradle 2. At step S14, the CPU 11 reads an IP address corresponding to the MAC address and sets it as a network terminal address of the handy terminal 1A. Furthermore, the CPU 11 reads store information and an encryption key (security key) corresponding to the MAC address and sets them. In this state, at step S15, the CPU 11 reads application specifying information corresponding to the store information by searching the store-by-store application table M3 using the store information and establishes a state that the corresponding application process is executable. At step S16, the CPU 11 starts a data communication with the server 4 via the LAN cradle 2 using the thus-set IP address.

If ending (disconnection) of the communication has not been commanded (S17: no) and the handy terminal 1A is kept mounted on (connected to) the LAN cradle 2 (S18: no), the communication process is continued. If ending of the communication has been commanded (S17: yes) or the handy terminal 1 has been removed from the LAN cradle 2 (S18: yes), the CPU 11 exits the process of FIG. 7.

In the second embodiment, the set IP address, store information, and encryption key are canceled by a person in charge by manual operations when he or she leaves the store. Alternatively, the handy terminal 1A may be configured to make new settings after canceling current settings when it is mounted on the LAN cradle 2 of the same store or another store.

As described above, in the second embodiment, when connected to a LAN cradle 2, the handy terminal 1A identifies the LAN cradle 2 and sets an IP address of the handy terminal itself, store information, and a wireless LAN encryption key according to the identified LAN cradle 2. Therefore, it is not necessary to re-set an IP address of the handy terminal itself, store information, and a wireless LAN encryption key manually every time the handy terminal 1A is connected to a cradle 2 having a communication function in a new subnet. The convenience is thus enhanced.

In a state that the handy terminal 1A is not mounted on a LAN cradle 2, the handy terminal 1A prohibits a wireless LAN encryption key from being set from a job menu. Therefore, to change the wireless LAN security setting, it is necessary to mount the handy terminal 1A on the LAN cradle 2. This contributes to security enhancement.

When mounted on a LAN cradle 2, the handy terminal 1A reads and sets an IP address, store information, and a wireless LAN encryption key corresponding to a MAC address that is read from the LAN cradle 2 by searching the address correspondence table M2 using the read-out MAC address. Therefore, an IP address, store information, and a wireless LAN encryption key can be set for each LAN cradle 2 merely by preparing the address correspondence table M2.

In the above-described second embodiment, an encryption key (wireless LAN security information) is set when the handy terminal 1A is mounted on a LAN cradle 2. Alternatively, wireless LAN log-in information may be set.

Embodiment 3

A third embodiment of the invention will be described below with reference to FIGS. 8 and 9.

In the above-described first embodiment, when mounted on a LAN cradle 2, the handy terminal 1 reads and sets an IP address and store information corresponding to a MAC address that is read from the LAN cradle 2 by searching the address correspondence table M2 using the read-out MAC address. In contrast, in the third embodiment, when mounted on a LAN cradle 2, a handy terminal 1B also sets a password of the store in which the LAN cradle 2 is installed. An essential part of the third embodiment will mainly be described below. Items having basically the same items or items having the same names in the first embodiment will be given the same reference symbols as the latter and will not be described in detail.

Figure 8:
FIG. 8 shows an address correspondence table M2 of a handy terminal 1B according to a third embodiment.

FIG. 8 shows an address correspondence table M2 of the handy terminal 1B. The address correspondence table M2 is an address table in which the MAC address of each of the LAN cradles 2A and 2B which are connected to the different subnets is correlated with not only a network terminal address (IP address) and store information for identification of the store in which the LAN cradle 2 is installed but also a password of the store. In the example of FIG. 8, not only an IP address "192.168.1.1" and store information "100" but also password "111111" of the store A is correlated with the MAC address "100" of the LAN cradle 2A of the store A. And not only an IP address "192.168.2.1" and store information "200" but also a password "22222" of the store B is correlated with the MAC address "200" of the LAN cradle 2B of the store B.

Figure 9:
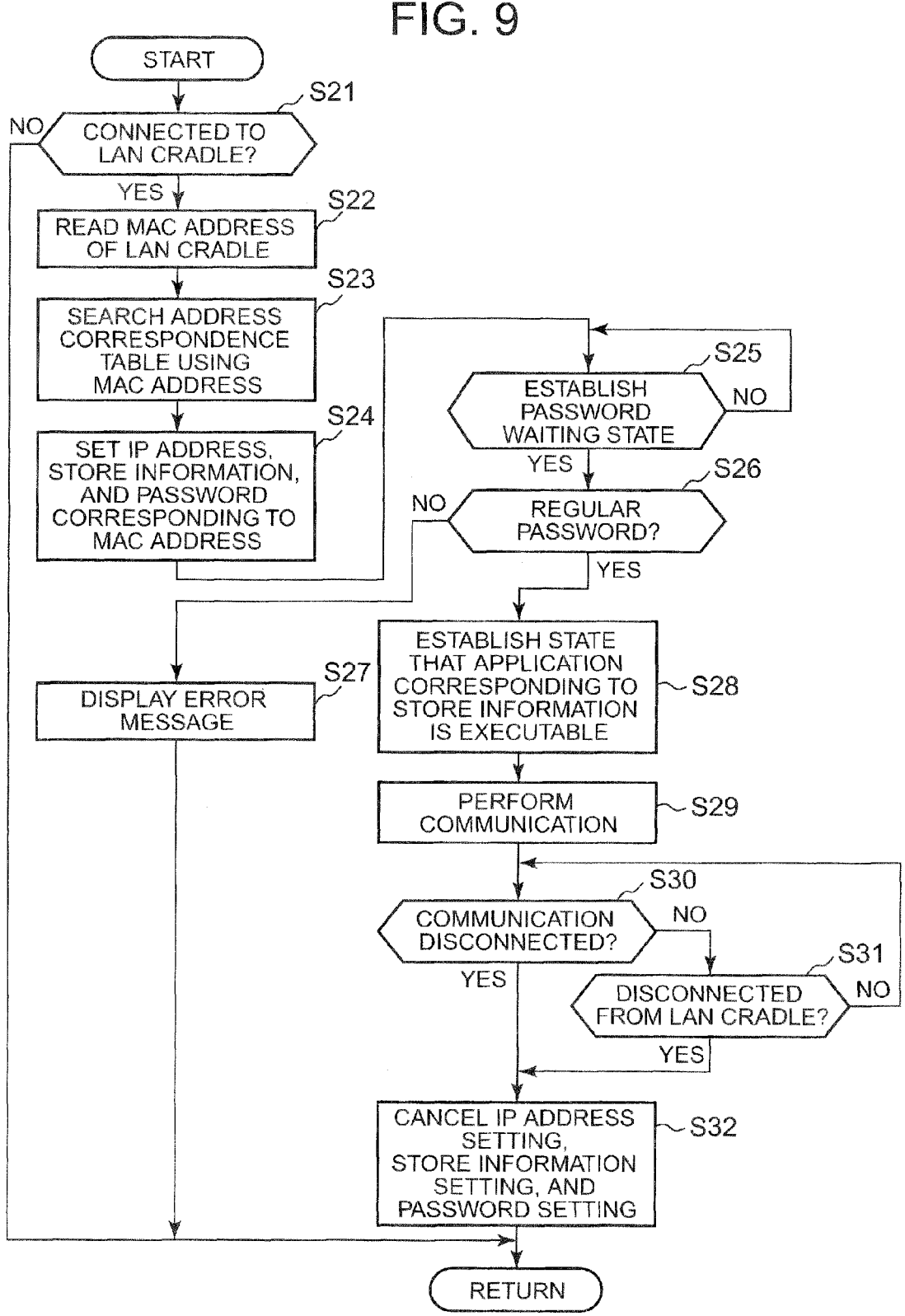
FIG. 9 is a flowchart of a communication process which is executed by the handy terminal 1B in response to an operation that commands a start of a communication.
Figure 10:
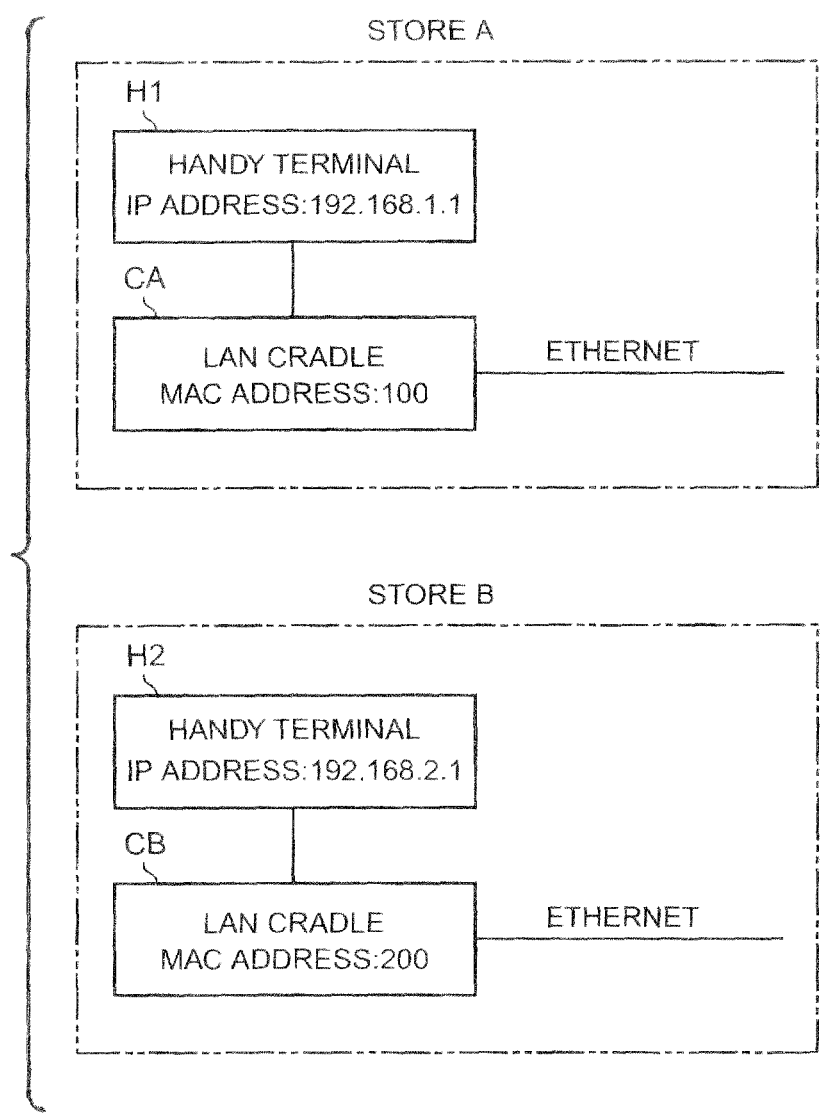
FIG. 10 illustrates a related-art communication network system.

FIG. 9 is a flowchart of a communication process which is executed by the handy terminal 1B according to the third embodiment in response to an operation that commands a start of a communication.

First, if the handy terminal 1b is not mounted on (connected to) the LAN cradle 2 (S21: no), the process of FIG. 9 is finished to invalidate the communication start operation. If the handy terminal 1B is mounted on the LAN cradle 2 (S21: yes), at step S22 the CPU 11 sends a MAC address transmission request to the LAN cradle 2 and acquires a MAC address that is transmitted from the LAN cradle 2 in response the request.

At step S23, the CPU 11 searches the address correspondence table M2 using the MAC address acquired from the LAN cradle 2. At step S24, the CPU 11 reads an IP address corresponding to the MAC address and sets it as a network terminal address of the handy terminal 1A. Furthermore, the CPU 11 reads store information and a password corresponding to the MAC address and sets them. At step S25, a password input waiting state is established. If a password is input (S25: yes), the input password is compared with the password that was set at step S24. If the input password is not the regular one (S26: no), at step S27 the CPU 11 performs processing of displaying an error message. Then, the CPU 11 exits the process of FIG. 9.

On the other hand, if the input password is the regular one (S26: yes), at step S28 the CPU 11 reads application specifying information corresponding to the thus-set store information by searching the store-by-store application table M3 using the store information and establishes a state that the corresponding application process is executable. At step S29, the CPU 11 starts a data communication with the server 4 via the LAN cradle 2 using the thus-set IP address. If ending (disconnection) of the communication has not been commanded (S30: no) and the handy terminal 1B is kept mounted on (connected to) the LAN cradle 2 (S31: no), the communication process is continued. If ending of the communication has been commanded (S30: yes) or the handy terminal 1 has been removed from the LAN cradle 2 (S31: yes), at step S32 the CPU 11 cancels the IP address setting used in the current communication is canceled to invalidate the IP address and also cancels the store information setting and the password setting. Then, the CPU 11 exits the process of FIG. 9.

As described above, in the third embodiment, when connected to a LAN cradle 2, the handy terminal 1B identifies the LAN cradle 2 and sets an IP address of the handy terminal itself, store information, and a password according to the identified LAN cradle 2. Therefore, it is not necessary to re-set an IP address of the handy terminal itself, store information, and a password manually every time a cradle 2 having a communication function that is connected to a new subnet is used. The convenience is thus enhanced. Furthermore, it becomes possible to prevent a third person who does not know the password of a store from using the LAN cradle 2 installed therein.

When mounted on a LAN cradle 2, the handy terminal 1B reads and sets an IP address, store information, and a password corresponding to a MAC address that is read from the LAN cradle 2 by searching the address correspondence table M2 using the read-out MAC address. Therefore, an IP address, store information, and a wireless LAN encryption key for each LAN cradle 2 can be set for each LAN cradle 2 merely by preparing the address correspondence table M2.

The handy terminal 1 cancels the IP address setting, the store information setting, and the password setting when removed (disconnected) from the LAN cradle 2. This makes it possible to set an IP address, store information, and a password easily for each LAN cradle 2.

Although each of the above embodiments is directed to the case that the handy terminal 1, 1A, or 1B is a handy terminal, the invention is not limited to such a case. The handy terminal may be a portable computer, a cell phone, a PDA, a digital camera, a music player, or the like.

Each of the "devices" and "units" used in each embodiment need not always be provided in a single cabinet and may be divided into parts which are to perform different functions and are provided in plural respective cabinets. Furthermore, the steps of each flowchart need not always be executed in time-series order. There may be steps that are executed in parallel or independently.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A handy terminal which is removably connectable to any of a plurality of cradles, wherein each cradle has a communication function and is connected to a network, and wherein the handy terminal comprises:
   a determining unit configured to determine whether or not the handy terminal is connected to a cradle;
   an identifying unit configured to identify the cradle to which the handy terminal is connected, when the determining unit determines that the handy terminal is connected to the cradle;
   a storage unit configured to store a plurality of network terminal addresses which are different for each of the plurality of cradles;
   a reading unit configured to read, from the network terminal addresses stored in the storage unit, a network terminal address corresponding to the identified cradle; and
   an address setting unit configured to set the read network terminal address.

2. The handy terminal of claim 1, further comprising a cradle-related information setting unit configured to set, based on the identified cradle, cradle-related information relating to the identified cradle.

3. The handy terminal of claim 2, wherein the cradle-related information setting unit is configured to set, as the cradle-related information, an installation area in which the identified cradle is installed, when the identifying unit identifies the cradle.

4. The handy terminal of claim 2, further comprising:
   a wireless communicating unit configured to communicate with the identified cradle through a wireless communication network when the determining unit determines that the handy terminal is not connected to the identified cradle,
   wherein the cradle-related information setting unit sets, as the cradle-related information, security information or log-in information of the wireless communication network, when the determining unit determines that the handy terminal is connected to the identified cradle.

5. The handy terminal of claim 2, wherein:
   the plurality of cradles are connected to different subnets and each of the plurality of cradles has a unique network terminal address;
   the storage unit is configured to store the network terminal addresses and the cradle-related information therein such that the network terminal addresses and the cradle-related information are correlated with each other;
   the identifying unit identifies the cradle by acquiring the unique network terminal address from the cradle, when the determining unit determines that the handy terminal is connected to the cradle; and
   the cradle-related information setting unit reads the cradle-related information from the storage unit, and sets the cradle-related information.

6. The handy terminal of claim 2, wherein the address setting unit cancels the setting of the network terminal address, when the determining unit determines that the handy terminal is disconnected from the cradle, and
   wherein the cradle-related information setting unit cancels the setting of the cradle-related information, when the determining unit determines that the handy terminal is disconnected from the cradle.

7. The handy terminal of claim 3, wherein when the cradle-related information setting unit sets the installation area as the cradle-related information, the handy terminal is configured to execute an application process corresponding to the installation area.

8. The handy terminal of claim 4, wherein the cradle-related information setting unit does not set the security information or the log-in information of the wireless communication network, when the determining unit determines that the handy terminal is not connected to the identified cradle.

9. The handy terminal of claim 3, wherein the cradle-related information setting unit sets, as the cradle-related information, a password for identifying the installation area, when the identifying unit identifies the cradle.

10. A non-transitory computer-readable medium having a program stored thereon for causing a computer of a handy terminal to perform functions comprising:
 (a) determining whether or not the handy terminal is connected to a cradle;
 (b) identifying the cradle when determining that the handy terminal is connected to the cradle;
 (c) storing a plurality of network terminal addresses which are different for each of a plurality of cradles;
 (d) reading, from the network terminal addresses stored in the storage unit, a network terminal address corresponding to the identified cradle; and
 (e) setting the read network terminal address.

* * * * *